United States Patent [19]

Wada et al.

[11] Patent Number: 5,077,114

[45] Date of Patent: Dec. 31, 1991

[54] POROUS ALUMINUM OXIDE FILM AND METHOD OF FORMING OF THE SAME

[75] Inventors: Kazuhiro Wada, Kyoto; Nobuyoshi Baba, Kawasaki; Sachiko Ono, Mitaka; Takako Yoshino, Tokyo, all of Japan

[73] Assignee: Kyoto University, Kyoto, Japan

[21] Appl. No.: 412,721

[22] Filed: Sep. 26, 1989

[30] Foreign Application Priority Data

Mar. 31, 1989 [JP] Japan .................................... 1-82140

[51] Int. Cl.$^5$ ............................................. B32B 3/10
[52] U.S. Cl. ................................... 428/131; 428/134
[58] Field of Search .............................. 428/131, 134

[56] References Cited

U.S. PATENT DOCUMENTS 3,671,410 6/1972 Stahr ...................................... 204/58
3,850,762 11/1974 Smith ...................................... 204/11

FOREIGN PATENT DOCUMENTS 178831 4/1986 European Pat. Off. .
2444541 6/1975 Fed. Rep. of Germany .

Primary Examiner—T. M. Tufariello
Attorney, Agent, or Firm—Schwartz & Weinrieb

[57] ABSTRACT

A porous aluminum oxide film has a plurality of pores passing through the film. Each pore has a pair of larger diameter pores and a smaller diameter pore. The smaller diameter pore is disposed in a central portion with respect to the thickness of the film, and the larger diameter pores are disposed upon both ends of the smaller diameter pore.

16 Claims, 4 Drawing Sheets

F I G. 2
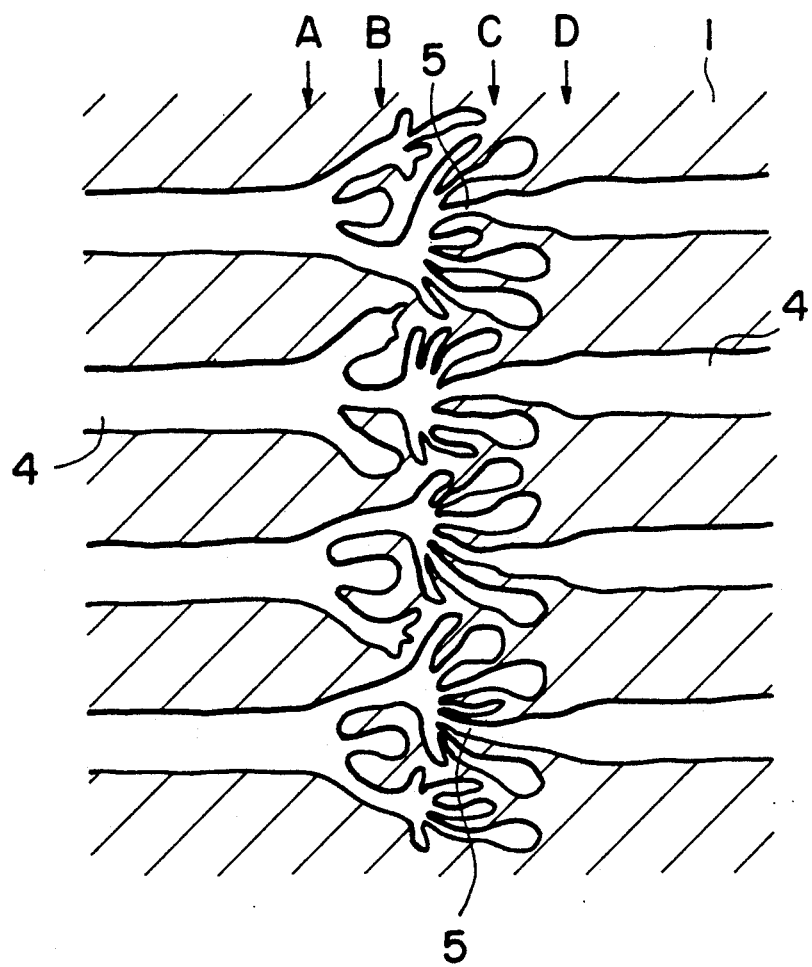

ELECTROLYTE ↑

↓ SUBSTRATE (ALUMINUM)

ELECTROLYTE ↑

↓ SUBSTRATE (ALUMINUM)

POROUS ALUMINUM OXIDE FILM AND METHOD OF FORMING OF THE SAME

FIELD OF THE INVENTION

The present invention relates to a porous aluminum oxide film having fine pores defined therein, each passing through the film, and more particularly to a porous aluminum oxide film available for use as a separation membrane.

BACKGROUND OF THE INVENTION

Heretofore, a porous filter or membrane fabricated from an organic material and having a plurality of pores defined therein, each having a very small diameter such as, for example, 0.05 $\mu$m, has been manufactured. The film exhibits advantages such as, for example, softness and toughness. However, the film has disadvantages in that it cannot be employed within a device disposed within a high-temperature fluid due to the fact that the diameter of each pore is liable to change, the pores may be clogged with foreign material, and furthermore, a larger pressure difference is required for passing a fluid through the film. Still further the resistivity against the effects of chemical agents, particularly organic solvents, is weak.

An inorganic porous separation membrane such as, for example a porous anodic aluminum oxide film has been developed to eliminate the above-mentioned disadvantages.

In a typical anodic aluminum oxide film, each pore comprises a larger diameter portion upon an electrolyte side and a smaller diameter portion having a plurality of fine branches adjacent an aluminum metal substrate. The smaller pores are formed by reducing the applied voltage during the final step of anodic oxidation of the aluminum metal substrate (European Patent Application 178831 A1).

The porous anodic aluminum oxide film exhibits the advantages of durability, higher separation efficiency owing to large porosity, and pores being prevented from clogging because of uniformity in pore diameter. The film, however, has disadvantages in that the aluminum oxide reacts with water because of its high activity so as to produce hydrates within pores, which are accumulated within the pores, resulting in an effective reduction of the pore diameter. Consequently, the film can not be used for a long period of time for separating a fluid containing water or moisture.

It is known that the reduction of the pore diameter because of the aforenoted hydration can be prevented by denaturing the noncrystalline aluminum oxide, produced by means of the electrolysis of the aluminum substrate, into a crystalline aluminum oxide such as $\gamma$ alumina, by means of heat treatment at high temperatures (furnace temperates of about 1100° C.).

It is reported that an experiment in which variations of electrical properties were investigated in order to obtain data concerning the hygroscopic degree of the porous aluminum oxide film was conducted on the basis that the electrical properties are dependent upon the hygroscopic degree, and that the electrical property that is the admittance of the film, without heat treatment, was reduced to one-fifth of its initial degree within approximately 4 months which means that the hygroscopicity of the film is high, and that, to the contrary, the admittance of the film heat-treated at 1100° C. did not change for one year, which means that such hygroscopicity of the film is very low.

Thus, it is understood from the facts described above that heat treatment is effective for preventing the pore diameter defined within the aluminum oxide film from changing over a period of time.

As described above, the porosity of the porous aluminum oxide is different upon its opposite sides. Accordingly, when the high temperature heat treatment of the film is performed in order to remove the hygroscopic property, the film is curved because of the difference between the porosities defined within the opposite sides. In an extreme case, the radius of its curvature can reach several millimeters. As a result, the area of the flat part of the film is severely reduced so that the film can not be used in practice.

OBJECTS OF THE INVENTION

It is an object of the present invention to provide a porous aluminum oxide film which does not deform upon heat treatment thereof so that the film may be used within a wide variety of industrial fields.

Another object of the present invention is to provide a method of preparing the porous aluminum oxide film.

SUMMARY OF THE INVENTION

It is known that the pore diameter of the porous anodic aluminum oxide film can be changed by changing the electrolysis voltage and also that if the voltage is changed substantially, for example so as to have a value of one-half of the voltage, several fine branches of pores are formed. Therefore, the diameter of the pore and the disposition of small diameter portions can be controlled by changing the applied voltage.

The present invention utilizes such a relationship between the diameter of the pore and the electrolysis voltage.

According to the present invention, there is provided a porous aluminum oxide film having a plurality of pores passing through the film, characterized in that, each pore has a pair of larger diameter pores and a smaller diameter pore, the smaller diameter pore is disposed within a central portion with respect to the thickness of the film, and the larger diameter pores extended from both faces of the film to the smaller diameter pore so as to communicate with the smaller diameter pore.

In an accordance with one aspect of the invention, the smaller diameter pore includes a plurality of branches.

A method of forming a porous aluminum oxide film is also disclosed.

The method comprises anodizing an aluminum substrate for forming an aluminum oxide film, changing the voltage applied to the aluminum substrate during the anodizing process so as to form a plurality of pores passing through the film so that each pore has a smaller diameter pore in the film at a central portion thereof with respect to the thickness of the film and a pair of larger diameter pores at both ends of the smaller diameter pore, and separating the aluminum oxide film from the aluminum substrate. The voltage is reduced during an intervening period of time of the anodizing process so as to form the smaller diameter pores.

BRIEF DESCRIPTION OF THE DRAWINGS

These and other objects and features of the present invention will become more apparent from the following detailed description with reference to the accompanying drawings.

FIG. 2 is an enlarged sectional view of a part of the film;

DETAILED DESCRIPTION OF THE PREFERRED EMBODIMENT

Figure 1:
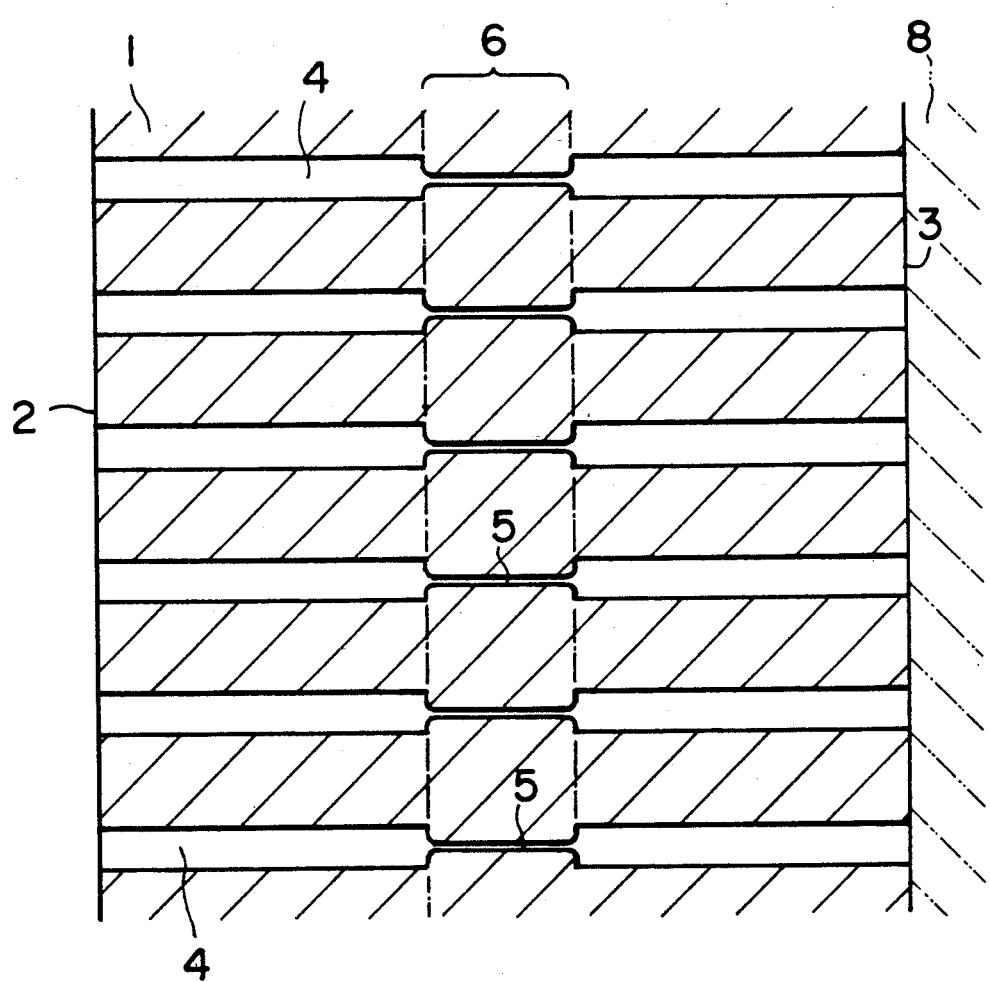
FIG. 1 is a schematic sectional view of a porous aluminum oxide film according to the present invention.

Referring to FIG. 1, an aluminum oxide film 1 has a plurality of parallel pores each of which extends from one face 2 to another face 3, and open at both faces. Each pore comprises a pair of larger diameter pores 4 and a smaller diameter pore 5 interposed between the pores 4 at a central portion with respect to the thickness of the film 1.

As shown in FIG. 2, each smaller diameter pore 5 comprises a plurality of fine branches so as to form a dense pore portion 6 (FIG. 1). At least one of the branches communicates with both pores 4.

Figure 3:
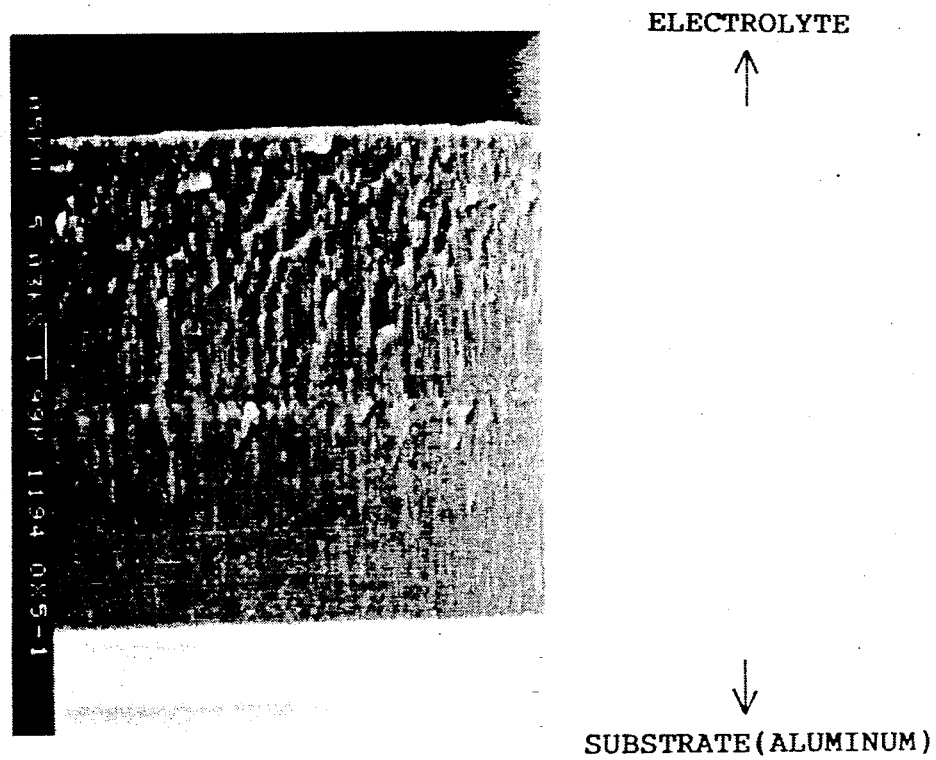
FIG. 3 is a scanning electron microscopic photograph of a section of the film of FIG. 1.
Figure 4:
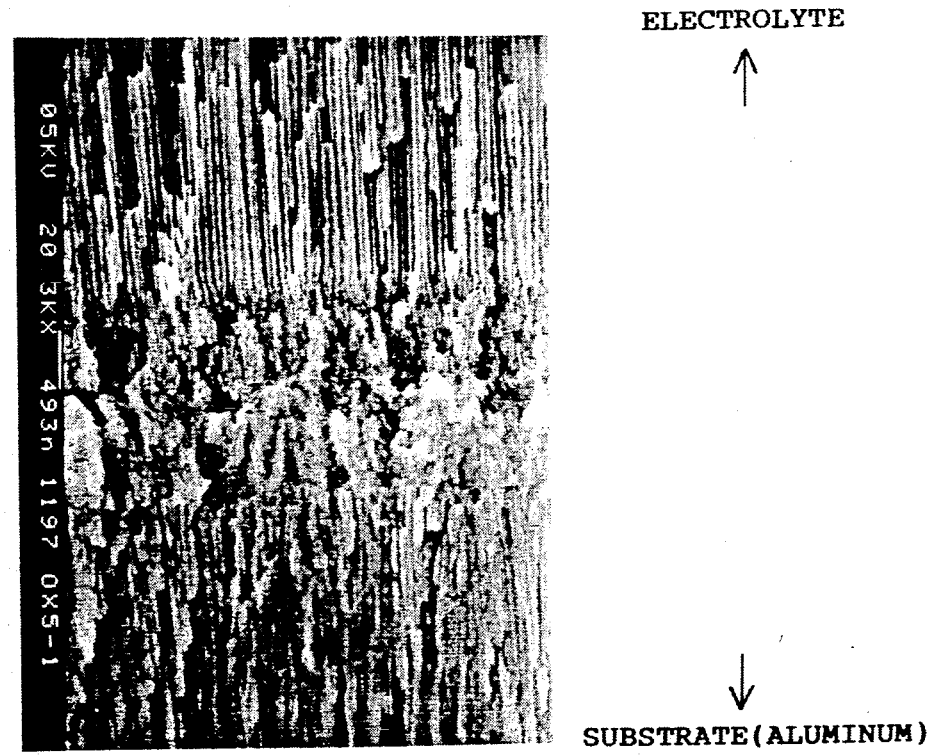
FIG. 4 is a scanning electron microscopic photograph of a section of the portion shown in FIG. 2.

FIGS. 3 and 4 are microscopic photographs. The photograph of FIG. 3 is equivalent to approximately 5000 magnifications and the photograph of FIG. 4 is equivalent to approximately 20,000 magnifications. Scales described in white represent 1.99 $\mu$m and 493 nm respectively. It will be seen that the diameter of the larger diameter pore 4 is equal to several tens of nanometers and the diameter of smaller pore 5 is equal to several nanometers.

Since the aluminum oxide film according to the present invention has pores each of which has a symmetrical shape with respect to the thickness of the film, the film does not deform upon heat treatment thereof. Since the heat-treated film has water-resistant properties, the diameter of each pore does not change as a function of time. Furthermore, because of the heat-resistant property, the film can be used for separating a water solution having a high temperature and high temperature gas including water vapor.

The method of forming the porous aluminum oxide film is hereinafter described.

Figure 5:
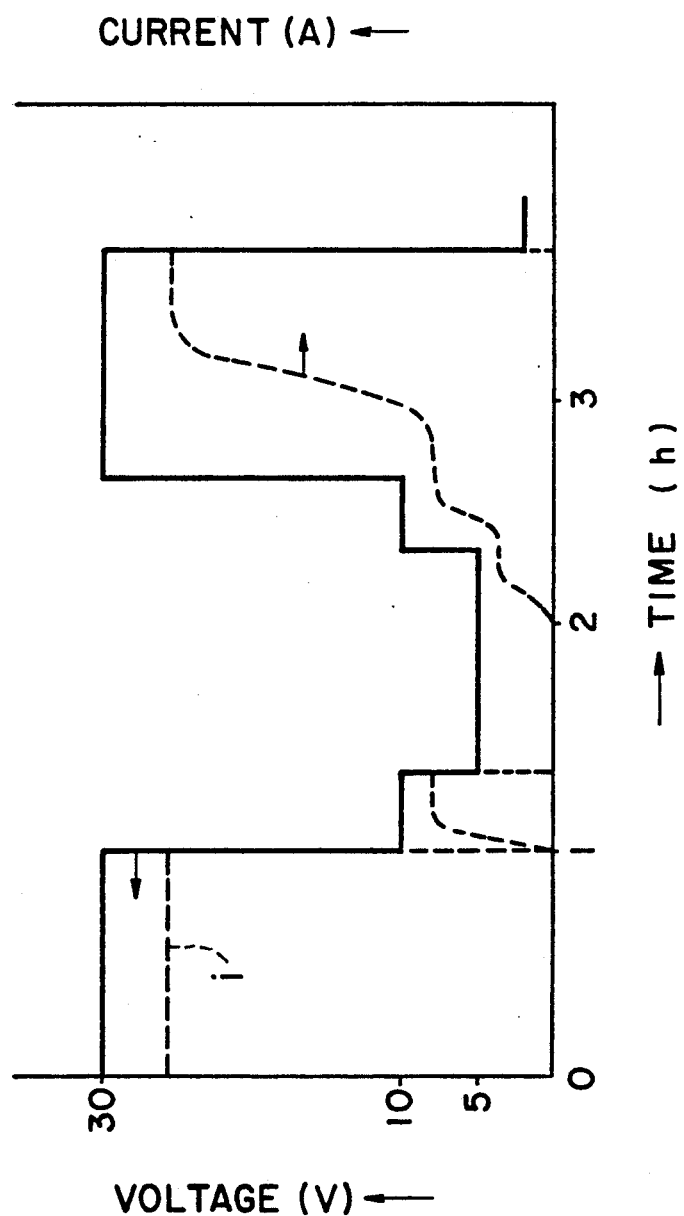
FIG. 5 is a graph showing electrolysis voltage and current, as a function of time, for forming the pores of the film of FIG. 2.

An aluminum metal substrate 8 (FIG. 1) is anodized in a water solution of oxalic acid so as to form the aluminum oxide film 1. As shown in FIG. 5, an initial voltage of 30 V is applied for one hour, thereby forming larger diameter pores 4. Thereafter, the voltage is reduced to 10 volts which is applied for 20 minutes so as to form larger branches A shown in FIG. 2. The voltage is further reduced to 5 volts and continued for one hour so as to form smaller branches B, thereby forming smaller diameter pores 5. Thereafter, a voltage of 10 volts is applied for 20 minutes and a voltage of 30 volts is applied for one hour, so that the diameter of the smaller diameter pore 5 progressively increases as at C and D and the larger diameter pore 4 is formed again. Finally, the voltage is reduced to 2 volts. The dotted line in FIG. 5 represents electrolysis current. The anodic oxide film is then separated from the substrate 8 by proper means, such as, for example by inverting the polarity of the electrolysis voltage.

The heat-treated film constructed or fabricated according to the present invention can be used for various purposes, such as for example:

the removal of noxious gases and particles dispersed within exhaust gases emitted from factories, plants and thermal power plants, and motor vehicles;

the removal of impurities within gaseous vapors, and radio active gases such as krypton and xenon within exhaust gases of atomic reactors;

the purification of fuel for fuel cells;

the separation of micro-organisms within liquids such as virus and bacteria, and organic compounds such as proteins, hormones and bacteria;

the desalting of seawater;

the condensation of alcohol; and dialysis.

Since the pores are symmetrically disposed with respect to the thickness of the film, enzymes, catalysts and the like can be reliably held within the pores. Consequently, the film can be used as a reactor bed for biochemical reactions and chemical reactions. Since the film is transparent, it can be used for providing an image display panel by filling the pores with a suitable material such that it emits light or color changes thereof changes when electric current passes there through.

From the foregoing, it will be understood that the present invention provides a porous aluminum oxide film which is not deformed upon heat treatment thereof because larger pores are symmetrically disposed with respect to the thickness of the film.

While the invention has been described in conjunction with a preferred specific embodiment thereof, it will be understood that this description is intended to illustrate and not limit the scope of the invention, which is defined by the following claims.

What is claimed is:

1. A porous aluminum oxide film having a plurality of pores passing therethrough, wherein:
    each pore comprises a pair of larger diameter pores and a smaller diameter pore;
    said smaller diameter pore is disposed within a central portion of said film with respect to the thickness of said film; and
    said larger diameter pores extend from both faces of said film to said smaller diameter pore so as to communicate with said smaller diameter pore.

2. A film as set forth in claim 1, wherein:
    said larger diameter pores are disposed upon opposite sides of said smaller diameter pore such that said larger diameter pores, together with said smaller diameter pore, form a linear array across said thickness of said film.

3. A film as set forth in claim 2, wherein:
    said plurality of pores, each comprising said smaller diameter pore and said larger diameter pores, are disposed parallel to each other so as to form a parallel array of said plurality of pores in a direction transverse to said thickness of said film.

4. A film as set forth in claim 1, wherein:
    said smaller diameter pore is interposed between said larger diameter pores such that said larger diameter pores, taken together with said smaller diameter pore, form a linear array across said thickness of said film.

5. A film as set forth in claim 4, wherein:
    said plurality of pores, each comprising said larger diameter pores and said smaller diameter pore, are disposed parallel to each other so as to form a parallel array of said plurality of pores in a direction transverse to said thickness of said film.

6. A film as set forth in claim 1, wherein:
said smaller diameter pore comprises a plurality of fine branches, at least one of said fine branches being in communication with at least one of said larger diameter pores.

7. A film as set forth in claim 1, wherein:
at least one of said fine branches of said smaller diameter pore is in communication with both of said larger diameter pores.

8. A film as set forth 1, wherein:
each of said larger diameter pores has one end thereof opening onto one of said surfaces of said film, and another end thereof in communication with said smaller diameter pore.

9. A porous aluminum oxide film having a plurality of pores passing therethrough, wherein:
each pore comprises a pair of larger diameter pores, and a smaller diameter pore;
said smaller diameter pore is disposed within a central portion of said film with respect to the thickness of said film; and
said larger diameter pores extend from both surfaces of said film toward said smaller diameter pore such that one end of each of said larger diameter pores communicates with one end of said smaller diameter pore,
said larger diameter pores and said smaller diameter pore forming a symmetrical array across said thickness of said film.

10. A film as set forth in claim 9, wherein:
said smaller diameter pore is interposed between said larger diameter pores such that said smaller diameter pore and said larger diameter pores form a linear array across said thickness of said film.

11. A film as set forth in claim 10, wherein:
said plurality of pores, each comprising said smaller diameter pore and said larger diameter pores, are disposed parallel to each other so as to form a parallel array of said plurality of pores in a direction transverse to said thickness of said film.

12. A film as set forth in claim 9, wherein:
said larger diameter pores are disposed upon opposite sides of said smaller diameter pore such that said larger diameter pores, taken together with said smaller diameter pore, form a linear array across said thickness of said film.

13. A film as set forth in claim 12, wherein:
said plurality of pores, each comprising said smaller diameter pore and said larger diameter pores, are disposed parallel to each other so as to form a parallel array of said plurality of pores in a direction transverse to said thickness of said film.

14. A film as set forth in claim 9, wherein:
said smaller diameter pore comprises a plurality of fine branches, at least one of said fine branches being in communication with at least one of said larger diameter pores.

15. A film as set forth in claim 14, wherein:
at least one of said fine branches of said smaller diameter pore is in communication with both of said larger diameter pores.

16. A film as set forth in claim 9, wherein:
each of said larger diameter pores has another end thereof opening onto one of said surfaces of said film.

* * * * *